(12) United States Patent
Tarman et al.

(10) Patent No.: US 12,217,559 B2
(45) Date of Patent: Feb. 4, 2025

(54) LOCKING DEVICES, SYSTEMS, AND METHODS OF USE

(71) Applicant: Purdue Research Foundation, West Lafayette, IN (US)

(72) Inventors: Justin Douglas Tarman, Goshen, IN (US); Matthew W. Barrett, Granger, IN (US); Nicholas Aaron Catanzarite, West Lafayette, IN (US); Jesse A. Ham, Mishawaka, IN (US); Dominic A. Layne, South Bend, IN (US)

(73) Assignee: Purdue Research Foundation, West Lafayette, IN (US)

( * ) Notice: Subject to any disclaimer, the term of this patent is extended or adjusted under 35 U.S.C. 154(b) by 151 days.

(21) Appl. No.: 17/930,777

(22) Filed: Sep. 9, 2022

(65) Prior Publication Data

US 2023/0005309 A1    Jan. 5, 2023

(51) Int. Cl.
  *E05B 71/00*   (2006.01)
  *G06Q 50/40*   (2024.01)
  (Continued)

(52) U.S. Cl.
  CPC ......... *G07C 9/00182* (2013.01); *G06Q 50/40* (2024.01); *E05B 47/0012* (2013.01);
  (Continued)

(58) Field of Classification Search
  CPC ........ G07C 9/00182; G07C 2009/0019; G07C 9/00571; G06Q 50/40; G06Q 50/30; G06Q 2240/00; E05B 47/0012; E05B 71/00; E05B 2047/0017; E05B 2047/002; E05B 2047/0095; E05B 73/0011; E05B 73/0029; E05B 73/0005; E05B 73/0017; E05B 45/005; E05B 69/006; E05B 67/28;
  (Continued)

(56) References Cited

U.S. PATENT DOCUMENTS 10,577,834 B1 *   3/2020   Luedtke ................... B62H 5/08
10,679,447 B2 *   6/2020   Wegelin ............. G07C 9/00912
(Continued)

FOREIGN PATENT DOCUMENTS

CN      112512905 A  *   3/2021   ............. B62H 5/003
DE   102021117523 A1 *   1/2022   ............. B62H 5/003
(Continued)

*Primary Examiner* — Suzanne L Barrett
(74) *Attorney, Agent, or Firm* — Hartman Global IP Law; Gary M. Hartman; Domenica N. S. Hartman

(57) ABSTRACT

Locking devices, systems, and methods for securing personal property to separate structures. Such a locking device includes a lock body, a cable within the lock body and having a first end accessible from an exterior of the lock body, a spool for extending and retracting the cable out of and into the lock body, a lock pin disposed at the first end of the cable, a cable lock incorporated into the lock body and configured to releasably secure the lock pin to the lock body, and an electronic communication and control unit incorporated into the lock body and configured to communicate with a remote device. The electronic communication and control unit controls the cable lock to secure and release the lock pin relative to the lock body to allow the remote device to wirelessly unlock the first end of the cable from the lock body.

17 Claims, 15 Drawing Sheets

(51) Int. Cl.
*G07C 9/00* (2020.01)
*E05B 47/00* (2006.01)

(52) U.S. Cl.
CPC . *E05B 2047/0017* (2013.01); *E05B 2047/002* (2013.01); *E05B 2047/0095* (2013.01); *E05B 71/00* (2013.01); *G07C 2009/0019* (2013.01)

(58) Field of Classification Search
CPC .. E05B 67/003; E05B 67/006; Y10T 70/5872; B62H 3/00; B62H 5/003; B62H 5/20; A47F 10/04; A47F 7/024; G05B 15/02; G01S 19/16
USPC .................................................. 70/233, 57.1
See application file for complete search history.

(56) References Cited

U.S. PATENT DOCUMENTS

| | | | |
|---|---|---|---|
| 11,932,337 B2* | 3/2024 | Landis | B62H 5/20 |
| 2010/0313614 A1* | 12/2010 | Rzepecki | B62H 5/145 |
| | | | 70/233 |
| 2014/0000322 A1* | 1/2014 | Williams | B62H 5/003 |
| | | | 70/18 |
| 2015/0020558 A1* | 1/2015 | Williams | E05B 73/0011 |
| | | | 70/18 |
| 2019/0340856 A1* | 11/2019 | Gilbert | E05B 47/0012 |

FOREIGN PATENT DOCUMENTS

| | | | | |
|---|---|---|---|---|
| GB | 2582535 A * | 9/2020 | | B62H 5/20 |
| WO | WO-2022190094 A1 * | 9/2022 | | E05B 47/0012 |

\* cited by examiner

LOCKING DEVICES, SYSTEMS, AND METHODS OF USE

BACKGROUND OF THE INVENTION

The present invention generally relates to devices for securing personal property, as a nonlimiting example, personal transportation equipment including bicycles, and in certain embodiments allow for remote sharing of the transportation equipment.

To prevent unauthorized use, bicycles are commonly secured to separate structures, including less mobile structures such as bicycle racks, with cables and portable locks (e.g., a keyed padlock, combination padlock, etc.). Such a cable is typically wrapped around a part of the bicycle as well as a part of the separate structure. Loops on ends of the cable were then secured to one another with the lock. More recently, bicycle locking options have expanded into new technologies such as those that allow for keyless operation, as examples, biometric locks and "smart locks" (which as used herein refers to locks that are configured to wirelessly communicate and be operated by a remote device such as a smart phone). However, despite an increase in locking options, bicycle theft continues to be an ongoing concern. For example, some estimates indicate that a bicycle is stolen in the United States every ten seconds.

Bicycle sharing programs are a type of transportation service in which bicycles are provided for shared use on a short-term basis. Many bicycle sharing programs allow riders to borrow a bicycle from a lockable bicycle rack (commonly referred to as a "dock") to be returned to the same or another dock at a later time. Alternatively, some bicycle sharing programs utilize self-locking bicycles and do not require docks. Modern bicycle sharing programs may include computerized activation and payment, either at the dock or via a system integrated into the bicycle. Due to their convenience and relatively low cost to riders, bicycle sharing programs have seen significant worldwide growth in recent years. For example, it is estimated that bicycle sharing ridership in the United States has grown 25% every year since 2010.

While bicycle sharing programs are rapidly innovating, there are still several drawbacks. For example, dock-based programs include a limited number of docks and therefore require riders to go to specific locations to obtain and return bicycles. This may be inconvenient for the rider and may require the program staff to redistribute bicycles between the docks to maintain a widespread inventory. Dockless programs may require the riders to return the bicycles to certain designated locations, in which case such programs suffer from similar shortcomings as the dock-based programs. Alternatively, certain dockless programs allow the riders to leave the bicycles in any location or within a relatively broad geographic boundary. Such programs have received criticism from communities due to riders leaving the bicycles in locations that are on private property, block pedestrian or vehicle traffic, and/or are considered to negatively affect community aesthetics. In addition, current bicycle sharing programs often require significant initial investment (e.g., docks, specialized bicycles, proprietary computer software, etc.) which may act as a barrier to entry into the market and may limit the growth and success of the programs.

In view of the above, it can be appreciated that there are certain problems, shortcomings or disadvantages associated with the prior art, and that it would be desirable if systems and methods were available for securing and/or sharing bicycles that were capable of at least partly overcoming or avoiding these problems, shortcomings or disadvantages.

BRIEF SUMMARY OF THE INVENTION

The present invention provides locking devices, systems, and methods for securing personal property to separate structures, as a nonlimiting example, securing personal transportation equipment including bicycles to bicycle racks, and in certain embodiments allow for remote sharing of the transportation equipment.

According to one nonlimiting aspect of the invention, a locking device is provided that is responsive to a remote device. The locking device includes a lock body, a cable within the lock body and having a first end accessible from an exterior of the lock body, a spool configured to extend and retract the cable out of and into the lock body, a lock pin disposed at the first end of the cable, a cable lock incorporated into the lock body and configured to releasably secure the lock pin to the lock body, and an electronic communication and control unit incorporated into the lock body and configured to communicate with a remote device. The electronic communication and control unit controls the cable lock to secure and release the lock pin relative to the lock body to allow the remote device to wirelessly unlock the first end of the cable from the lock body.

According to another nonlimiting aspect of the invention, the cable lock includes a pin capture hole in the lock body and configured to receive the lock pin, a pin capture member within the lock body that shifts between a capture position that prevents the locking pin from being retracted from the pin capture hole and a release position that allows the locking pin to be retracted from the pin capture hole, a lock member that shifts between a locked position that maintains the pin capture member in the capture position and an unlocked position that allows the pin capture member to shift to the release position, and a drive mechanism configured to shift the lock member between the locked position and the unlocked position. The drive mechanism includes an electric motor and a gear assembly operatively coupling the electric motor to the locking member, and the electronic communication and control unit controls the electric motor in response to commands received from the remote device to selectively shift the lock member between the locked position and the unlocked position.

According to yet another nonlimiting aspect of the invention, the locking device may be part of a system that includes the remote device and a software application configured to operate on the remote device, communicate with the communication and control unit of the locking device, and provide the commands to selectively shift the lock member between the locked position and the unlocked position.

According to still another nonlimiting aspect of the invention, a method of locking a bicycle is provided that includes securing a lock body of a locking device on a part of the bicycle, pulling on a first end of a cable accessible from an exterior of the lock body in a direction away from the lock body to uncoil a portion of the cable from a spool within the lock body and extend the portion of the cable from the lock body, and locking the bicycle to a separate structure by wrapping the cable around the separate structure and locking a locking pin on the first end of the cable to the lock body. Locking the locking pin includes capturing the locking pin in a pin capture hole in the lock body with a pin capture member shifted into a capture position, and shifting a lock member in the lock body with a motorized drive mechanism to a locked position that maintains the pin capture member in the capture position. The method also includes wirelessly unlocking the locking pin to unlock the bicycle from the separate structure.

Technical aspects of a locking device comprising elements as described above include its ability to securely lock personal property, including but not limited to personal transportation equipment such as bicycles, to separate structures including but not limited to bicycle racks. An optional feature of the locking device is the ability to facilitate sharing of a bicycle within a community. For this purpose, the communication and control unit incorporated into the lock body can be used to remotely unlock the bicycle from a separate structure.

Other aspects and advantages of this invention will be appreciated from the following detailed description.

DETAILED DESCRIPTION OF THE INVENTION

Figure 1:
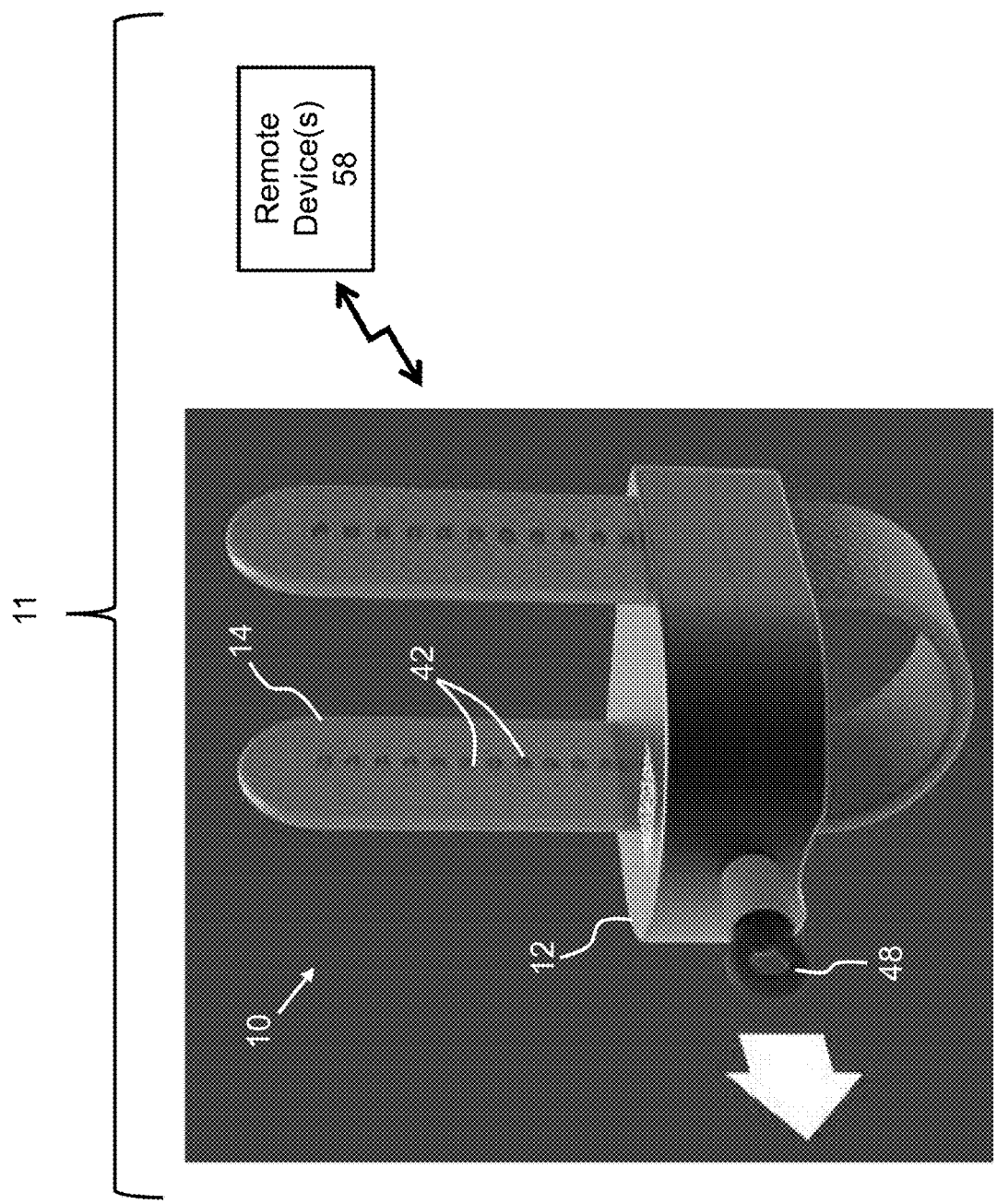
FIG. 1 represents a locking device for securing personal transportation equipment, including a bicycle, in accordance with certain nonlimiting aspects of this invention.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also identifies certain but not all alternatives of the embodiment(s) depicted in the drawings. Therefore, the appended claims, and not the detailed description, are intended to particularly point out subject matter regarded as the invention, including certain but not necessarily all of the aspects and alternatives described in the detailed description.

FIGS. 1 through 14 represent various aspects of an embodiment of a locking device 10 for securing personal transportation equipment, including bicycles, a system 11 that utilizes the locking device 10, and a method of operating a bicycle sharing program with the locking device 10 and system 11 through wireless communications with one or more remote devices 58, as nonlimiting examples, smart phones. Although the locking device 10 is described and illustrated herein with reference to bicycles, the locking device 10 may be used with other transportation equipment, such as manual kick scooters, motorized scooters, skateboards, etc. The locking device 10 and the system 11 combine the convenience of bicycle sharing functionality with the security of a consumer bicycle. The locking device 10 includes adaptable locking components suitable for securing the locking device 10 to various bicycles and securing such bicycles to various other structures, including immobile and relatively immobile structures such as bicycle racks. The locking device 10 and system 11 may allow individual entry into the bicycle sharing market with significantly lower investment relative to existing bicycle sharing programs by allowing the individual to securely share a bicycle whose structure has not been directly modified for the purpose of sharing. Instead, the locking device 10 may be releasably secured to the bicycle to provide bicycle sharing functionality.

Figure 2:
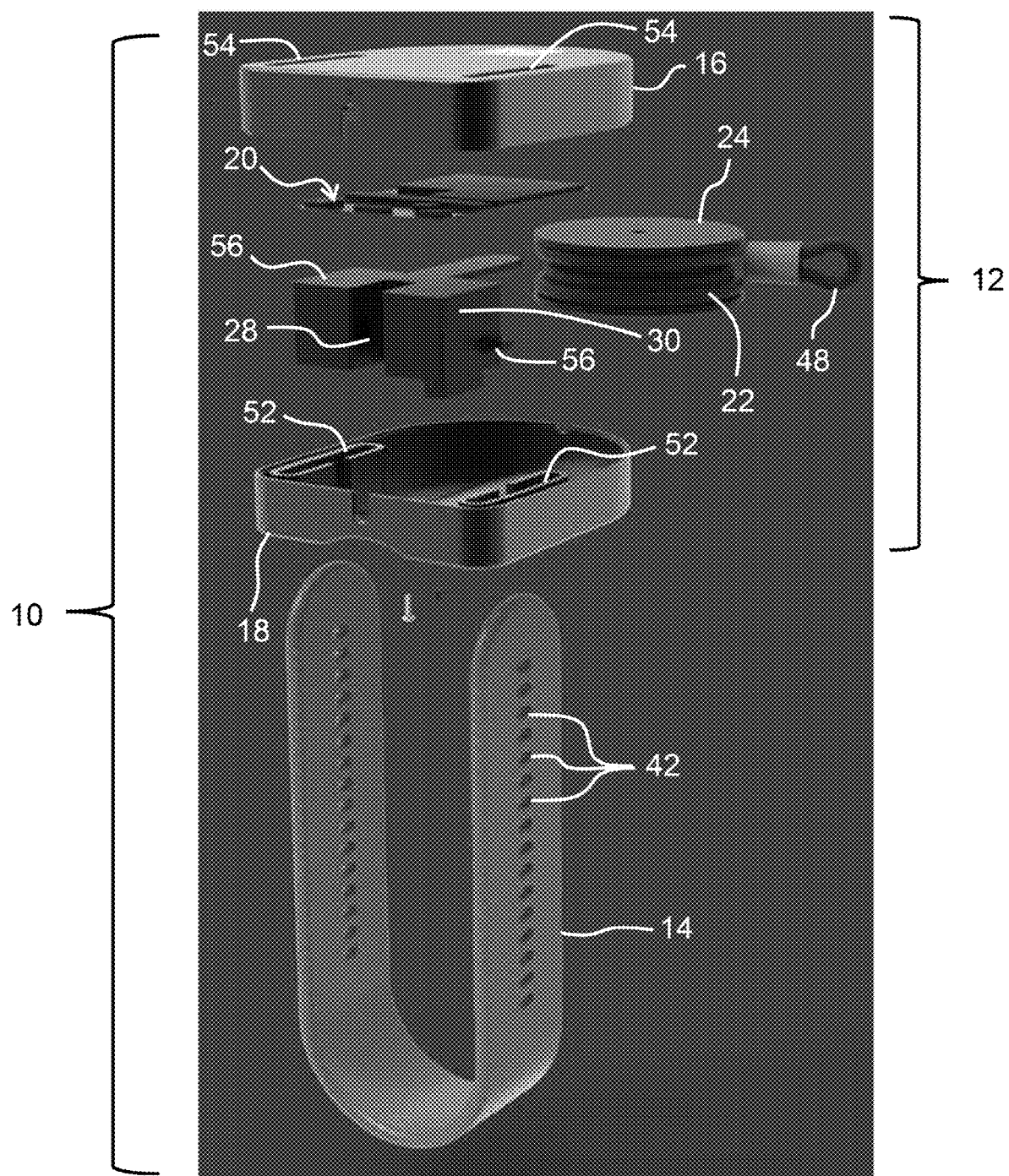
FIG. 2 represents an exploded view of the locking device of FIG. 1.

FIGS. 1 and 2 represent the locking device 10 as including a lock body 12 configured to be secured to a part of a bicycle with a strap 14. The lock body 12 includes two or more body portions 16 and 18 that are fixed to one another and define a hollow, enclosed compartment therebetween. Stored within the compartment, the locking device 10 includes a retractable cable 22, which in the nonlimiting embodiment shown is coiled on a spool of a spring coil mechanism 24 that is coupled to a motorized device 26. FIG. 2 further represents the compartment of the lock body 12 as containing a unit 20 that provides a communication and/or control capability (hereinafter, communication and control unit 20) to the locking device 10 and system 11.

The cable 22 includes a first end T that is accessible from an exterior of the lock body 12 and the spring coil mechanism 24 is configured for coiling the cable 22 within the lock body 12 and enabling the cable 22 to be selectively extended from the lock body 12 by pulling on the first end 48 thereof. The motorized device 26 includes a locking mechanism 28 that is configured to releasably secure the first end 48 of the cable 22 to the lock body 12. In the nonlimiting embodiment shown, the lock body 12 includes a hole 50 for inserting a loop at the first end 48 of the cable 22 into the lock body 12. Once inserted into the hole 50, the locking mechanism 28 may secure the loop within the lock body 12. For example, a component (not shown) of the locking mechanism 28 may be inserted into and through the loop to secure the loop within the lock body 12. Such a component may include an elongated member, a hook member, a clamp member, or other member suitable for selectively retaining the loop within the lock body 12.

The motorized device 26 is also represented in FIG. 2 as including a clamping mechanism 30 configured to interact with the strap 14 to releasably clamp the lock body 12 to a part of a bicycle, stabilize the lock body 12 on the part while the bicycle is in use, and release the lock body 12 for removal of the lock body 12 from the bicycle. In the nonlimiting embodiment shown, the strap 14 is formed or elastically deformable to have a U-shape that defines opposite ends 46 that are capable of being inserted into entry slots 52 in the lock body 12, through the lock body 12, and out of exit slots 54 on an opposite side of the lock body 12. The clamping mechanism 30 is configured to interact with portions of the strap 14 located within the compartment to allow and/or restrict the portions of the strap 14 from sliding into or out of the entry and exit slots 52 and 54.

In the embodiment shown in FIGS. 1 and 2, the strap 14 includes two rows of holes 42 spaced apart and aligned along the length of the strap 14. The clamping mechanism 30 includes a pair of protruding members 56 biased outwardly from opposite sides of the motorized device 26 and configured to be received within or otherwise mechanically engage the holes 42 of the strap 14. In combination, the strap 14 and the protruding members 56 of the clamping mechanism 30 operate in a manner such as or similar to a zip tie (cable tie), that is, the ends 46 of the strap 14 may be manually inserted into the entry slots 52, through the lock body 12, and out of the exit slots 54 without being obstructed by the protruding members 56. This may be accomplished by providing beveled, chamfered, or rounded edges on entry slot sides of the protruding members 56 which allow the strap 14 to force the protruding members 56 into the motorized device 26 as the strap 14 is inserted into the lock body 12 and moved in a direction from the entry slot 52 toward the exit slot 54. During such action, each of the holes 42 pass and receive their respective protruding member 56 but are otherwise not restricted thereby.

In contrast, exit slot sides of the protruding members 56 do not include the beveled, chamfered, or rounded edges and as such once received within respective holes 42 of the strap 14, the protruding members 56 act as barriers that prevent movement of the strap 14 in a direction from the exit slots 54 toward the entry slots 52. To release the strap 14 for movement in the direction from the exit slots 54 toward the entry slots 52, the protruding members 56 may be actuated by the clamping mechanism 30 such that the protruding members 56 are retracted in directions toward the motorized device 26 at least to an extent that the protruding members 56 are removed from their respective holes 42 of the strap 14 so that the protruding members 56 no longer act as barriers to prevent movement of the strap 14.

The communication and control unit 20 may include various components, including but not limited to one or more circuit boards, processors, non-volatile non-transitory memory, volatile memory (e.g., RAM), and network components. Components of the communication and control unit 20 may be operatively coupled by an internal communication bus. The network components may include one or more network transceivers for wired (e.g., ethernet) or wireless (e.g., WAN, Bluetooth, cellular, etc.) connectivity to other devices. The memory may store executable instructions and data such as executable instructions for an operating system and various applications.

Figure 3:
FIG. 3 represents the locking device of FIG. 1 secured to a bicycle in accordance with certain nonlimiting aspects of this invention.

FIG. 3 represents the locking device 10 as secured to a down tube of a frame of a bicycle 60, though the locking device 10 could instead be secured to a top tube (i.e., crossbar), fork, or another member of the bicycle 60. As represented, the lock body 12 is secured to the bicycle 60 with the strap 14. For convenience, the strap 14 will be referred to as including first, second, and third portions, in which the first and second portions of the strap 14 are leg portions of the U-shape of the strap 14 and define the opposite ends 46 that protrude from the exit slots 54 on the opposite side of the lock body 12, while the third portion of the strap 14 is a base portion of the U-shape of the strap 14 and therefore is a midsection of the strap 14 between the ends 46.

Figure 6:
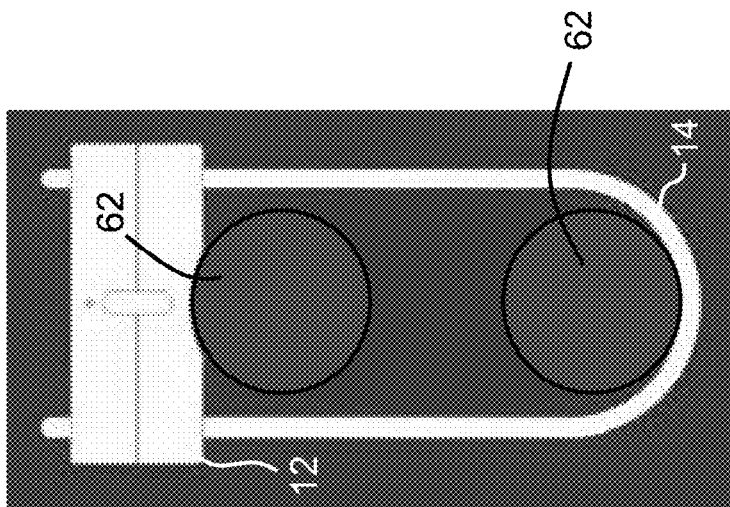
FIGS. 4, 5, and 6 schematically represent cross-sectional views representing the locking device of FIG. 1 clamped to various parts of bicycles requiring allowance for different cross-sectional areas.

The locking device 10 is configured to allow the strap 14 to be selectively inserted into and removed from the lock body 12 such that lengths of the first, second, and third portions are adjustable. This allows the locking device 10 to be clamped to various sizes and shapes of parts of bicycles. For example, FIGS. 4 and 5 each represent the strap 14 surrounding a single individual member 62 of a bicycle so that the locking device 10 is clamped to the individual member 62. As evident, the member 62 represented in FIG. 5 has a larger cross-sectional area than the member 62 represented in FIG. 4. FIG. 6 represents the strap 14 surrounding two individual members 62 of a bicycle so that the locking device 10 is simultaneously clamped to both individual member 62. As represented, adjustment of the strap 14 relative to the lock body 12 allows for increases or decreases of an area defined between the entry slot side of the lock body 12 and the third portion of the strap 14. As such, FIGS. 4 through 6 evidence that the locking device 10 can be secured to various parts of bicycles whose available members for securement vary widely in size (cross-sectional areas), shapes, and numbers.

Figure 5:
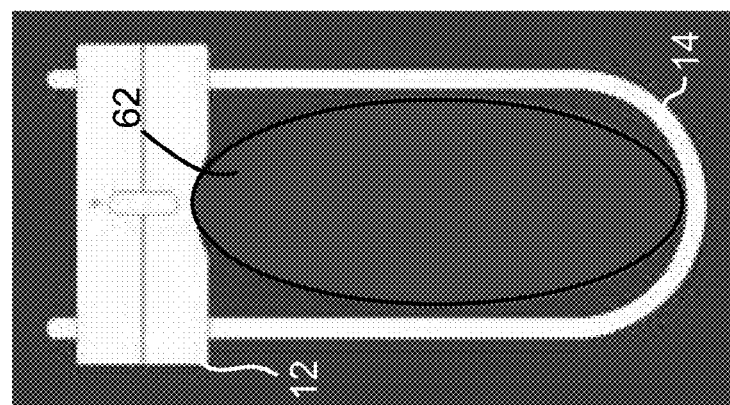
Figure 4:
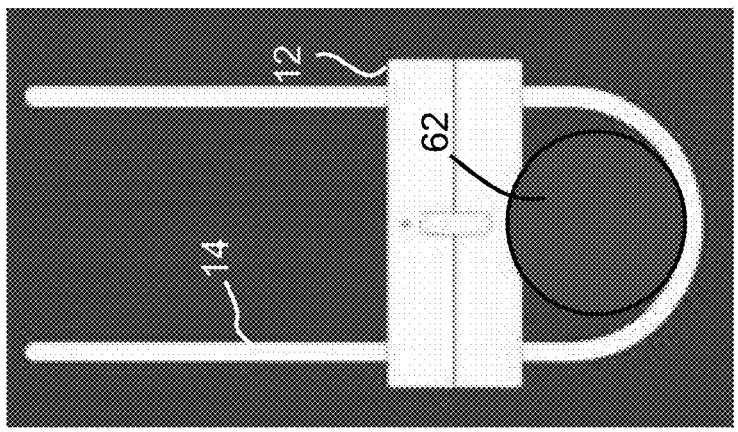

As evident from FIGS. 4 through 6 (and with further reference to FIG. 2), the locking device 10 may be secured to a bicycle by inserting a first of the ends 46 of the strap 14 into a first of the entry slots 52, through the lock body 12, and out of the corresponding exit slot 54. The lock body 12 may be placed adjacent a member 62 of the bicycle and a second of the ends 46 of the strap 14 may be wrapped around the same or other member 62 of the bicycle and inserted into a second of the entry slots 52, through the lock body 12, and out of the corresponding exit slot 54. The first and/or second ends 46 (i.e., first and second leg portions) of the strap 14 may then be pulled in directions away from their respective exit slots 54 and the lock body 12 such that the third (base) portion of the strap 14 tightens about the same/other member 62 until the member(s) 62 is/are clamped between the third (base) portion of the strap 14 and the lock body 12 to firmly secure the lock body 12 to the bicycle.

Once secured to a bicycle, the locking device 10 may be used to secure the bicycle to a separate structure by pulling on the first end 48 of the cable 22 in a direction away from the lock body 12 to uncoil a portion of the cable 22 from the spring coil mechanism 24 within the lock body 12 and extend the portion of the cable 22 from the lock body 12. The portion of the cable 22 extended from the lock body 12 may then be wrapped around the separate structure and then the first end 48 of the cable 22 may be locked to the lock body 12, for example, by inserting the loop of the first end 48 into the hole 50 of the lock body 12 and activating the locking mechanism 28 to secure the first end 48 of the cable 22 therein.

In certain embodiments, communication and control unit 20 of the locking device 10 may include components of a tamper alert system configured to detect unauthorized interaction with the locking device 10 and produce an alert or an alarm in response to detection thereof. For example, the locking device 10 may include sensors configured to sense unauthorized movement of the locking device 10, contact with the lock body 12 or the strap 14, separation of the body portions 16 and 18 of the lock body 12, or other actions that may indicate an individual is attempting to physically interact with the locking device 10 without authorization. Such interactions may include but are not limited to vandalizing the bicycle and/or the locking device 10, removing the locking device 10 to steal the locking device 10 and/or the bicycle, and/or riding the bicycle without permission. In certain embodiments, the tamper alert system may be configured to detect an individual attempting to remotely interact with the communication and control unit 20, software, and/or data of the locking device 10 via a wireless connection.

Figure 8:
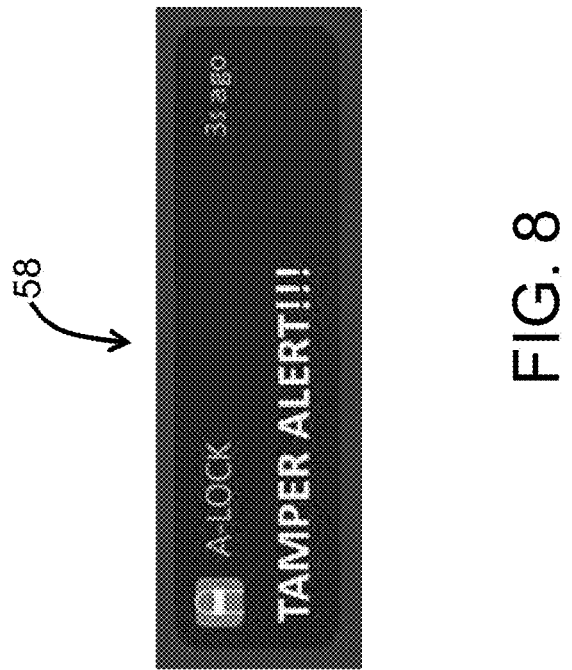
FIG. 8 represents a nonlimiting notification that may be generated by the tamper alert system of the locking device of FIG. 1 and transmitted to a remote device.
Figure 7:
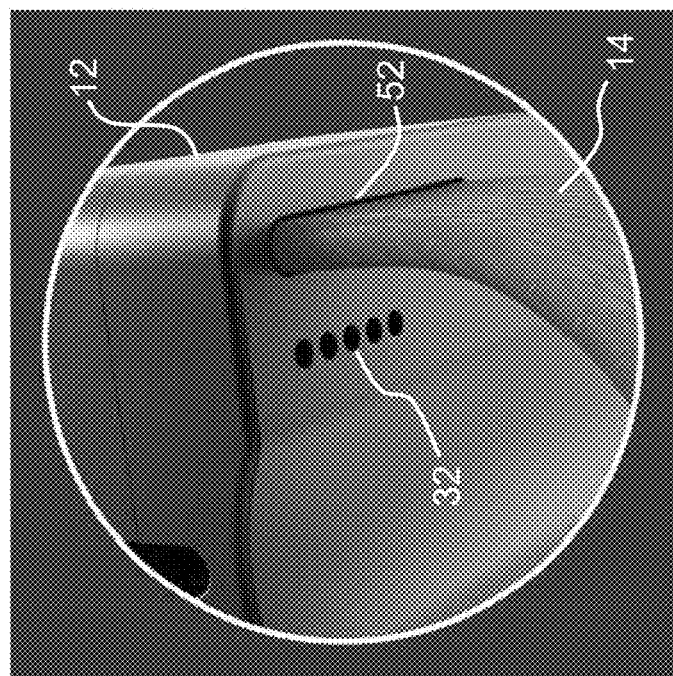
FIG. 7 represents the locking device of FIG. 1 as including a speaker configured to produce an audible alarm in response to a tamper alert system of the locking device detecting unauthorized interaction with the locking device.

In response to detecting unauthorized interaction with the bicycle and/or the locking device 10, the tamper alert system may generate an alarm, alert, or notification. For example, the locking device 10 may include one or more speakers 32 (FIG. 7) and/or light sources (not shown) configured to produce audible or visual alarms, respectively, as instructed by the tamper alert system. As another example, the locking device 10 may be configured to wirelessly communicate an alert or notification to the one or more remote devices 58 as instructed by the tamper alert system. FIG. 8 represents a nonlimiting notification that may be generated by the locking device 10 and transmitted to the remote device 58, such as a mobile phone (e.g., smart phone).

Figure 9:
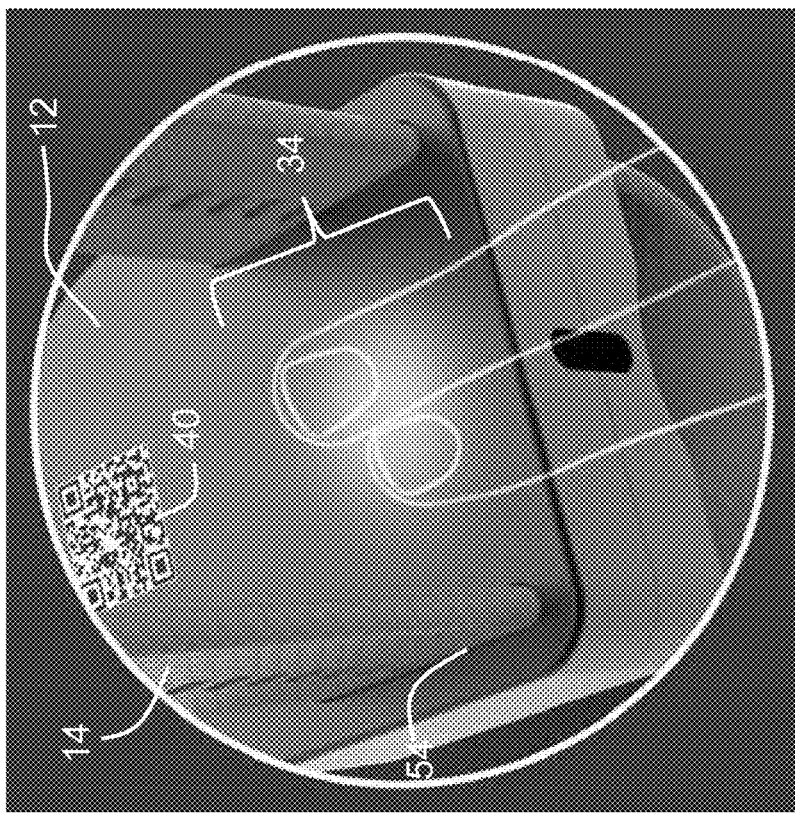
FIG. 9 represents the locking device of FIG. 1 as including a touch sensitive area that is configured to perform a function in response to contact with an authorized user.

In certain embodiments, the communication and control unit 20 of the locking device 10 may include a control interface configured to manually initiate the locking mechanism 28 to unlock the first end 48 of the cable 22 and/or initiate the clamping mechanism 30 to release the strap 14. The control interface may include various components such as but not limited to keypads, combination dials, digital touchscreen displays, biometric sensors, keyed locks, etc. As a nonlimiting example, FIG. 9 represents the lock body 12 of the locking device 10 as including a touch sensitive area 34 that is configured to activate the motorized device 26 in response to contact with an authorized user. For example, the touch sensitive area 34 may be configured to identify one or more fingerprints stored in the memory of the communication and control unit 20.

Figure 10:
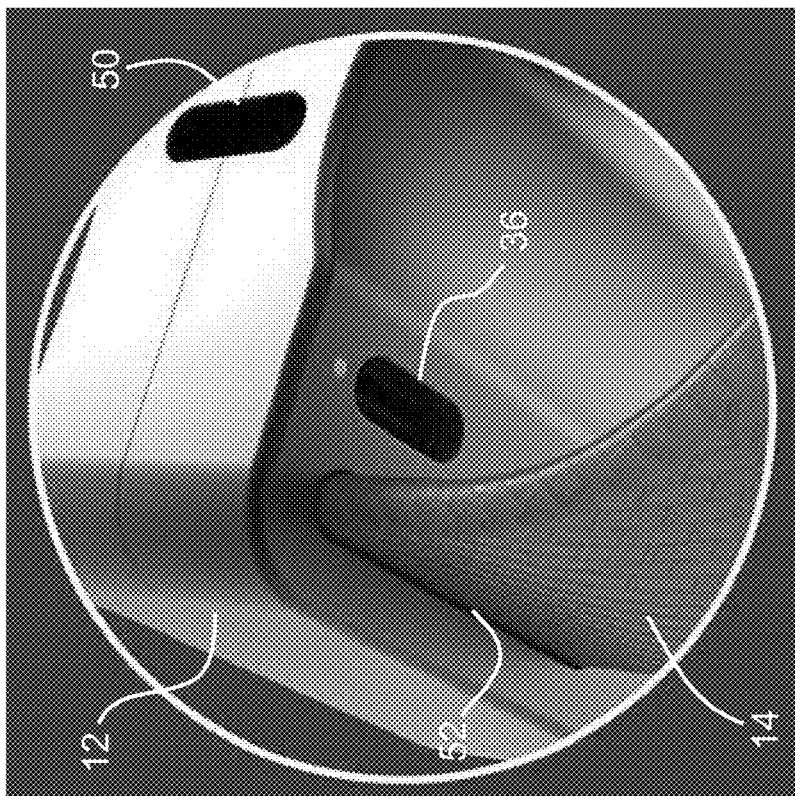
FIG. 10 represents the locking device of FIG. 1 as including a connection point configured for coupling an internal battery pack (not shown) to an external power source for recharging the battery pack.

In certain embodiments, the communication and control unit 20 of the locking device 10 may include a power source, such as a battery or a battery pack, configured to provide sufficient electrical power to the electrical components and the motorized device 26 to operate the locking device 10. FIG. 10 represents the locking device 10 as including a connection port 36 configured for coupling an internal battery pack (not shown) to an external power source and recharging the battery pack. In this instance, the connection port 36 is a USB-C port configured to receive a corresponding USB-C connector of an electrical cable.

Figure 11:
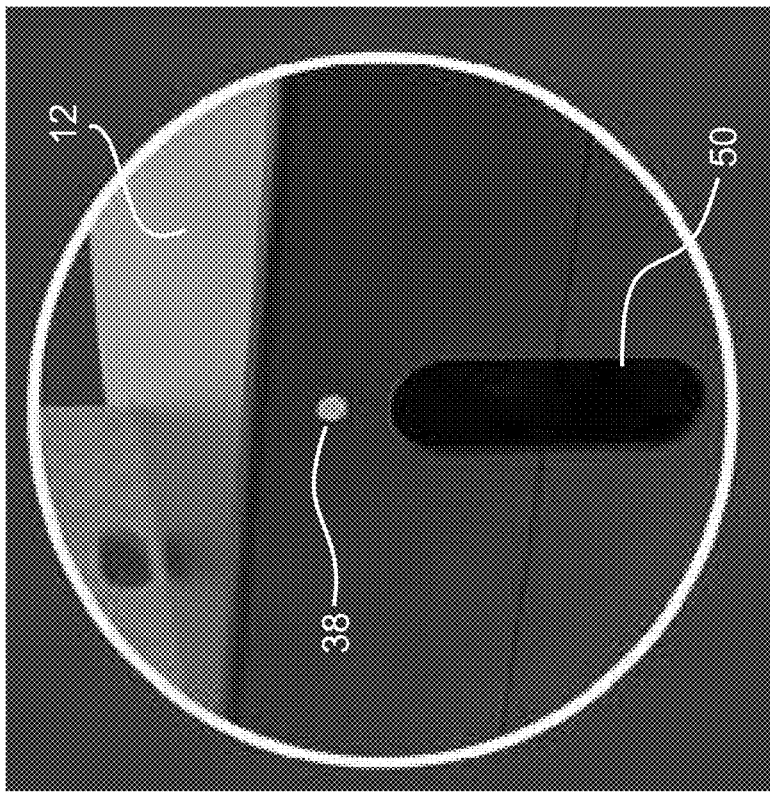
FIG. 11 represents the locking device of FIG. 1 as including a colored light source configured to visually indicate a status of the locking device.

In certain embodiments, the locking device 10 may include an indicator 38 configured to display a status of the locking device 10 that may be generated by the communication and control unit 20. FIG. 11 represents a colored light source located adjacent the hole 50 of the lock body 12 that is configured to visually indicate a status of the locking device 10. For example, the light source may continuously emit a green colored light to indicate that the locking mechanism 28 is in an unlocked position, flash the green colored light to indicate that the locking device 10 and the bicycle are currently available for use, continuously emit a red colored light to indicate that the locking mechanism 28 is in a locked position, and flash the red colored light to indicate that the battery pack is low and needs recharging or replacement.

Figure 12:
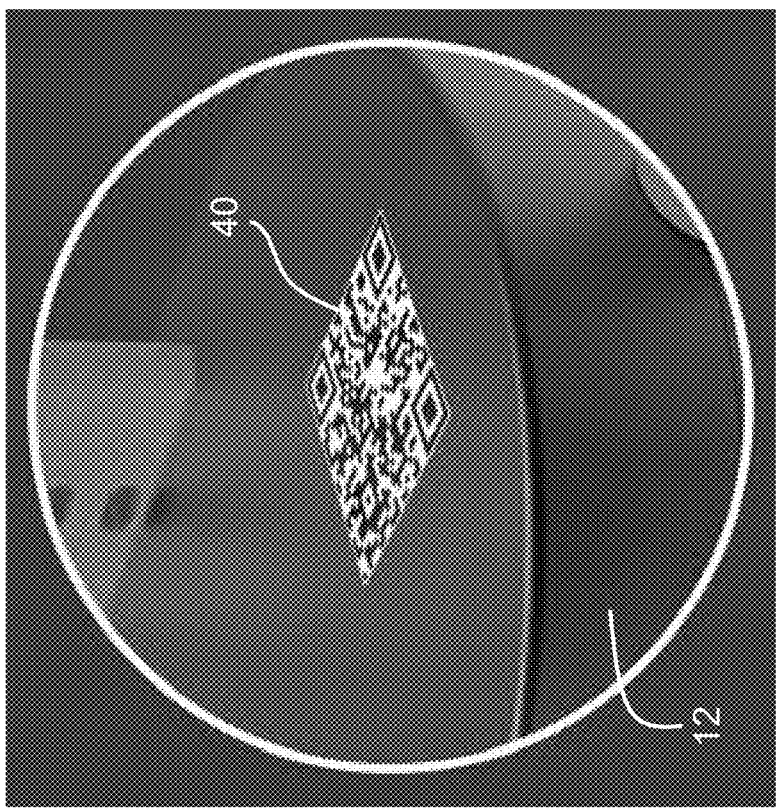
FIG. 12 represents the locking device of FIG. 1 as including a QR code that may be electronically scanned with a device capable of such operation (e.g., smart phone) to identify the locking device.

In certain embodiments, the locking device 10 may include components and/or markings that are configured to provide an identification corresponding to the locking device 10. Such components and/or markings may include but are not limited to serial numbers, bar codes, RFID tags, or other components and/or markings capable of identification of the locking device 10. For example, FIG. 12 represents the locking device 10 as including a QR code 40 that may be electronically scanned with a device capable of such operation (e.g., a smart phone) to identify the locking device 10 and subsequently perform other actions such as but not limited to requesting access to the bicycle, paying for use of the bicycle, and/or ceasing use of the bicycle.

The communication and control unit 20 may be configured to wirelessly communicate with the one or more remote devices 58 to provide bicycle sharing functionality within the system 11. For this purpose, the communication and control unit 20 may include one or more network components capable of wirelessly communicating with at least one remote device 58 to enable the remote device 58 to control certain functions of the locking device 10. For example, the communication and control unit 20 may allow an authorized user of the remote device 58 to wirelessly unlock the first end 48 of the cable 22 from the lock body 12.

In FIG. 1, the locking device 10 is represented as a component of or at least as functioning in combination with the system 11, which may be a network that includes a remote server and one or more software applications that enable the communication and control unit 20 of the locking device 10 to wireless communicate with one or more remote devices 58. For example, the software application may be configured to operate on the remote device 58, communicate with the communication and control unit 20 of the locking device 10 from a geographic location that is remote from the locking device 10, and provide remote bicycle sharing functionality for a bicycle. The software application may be specific to the owner of the locking device 10, or may provide a bicycle sharing program that may incorporate a plurality of bicycles with locking devices 10 thereon. The software application may be configured to operate on various remote devices 58 capable of communication with the communication and control unit 20, such as but not limited to computers, computer tablets, and smart phones.

Figure 13:
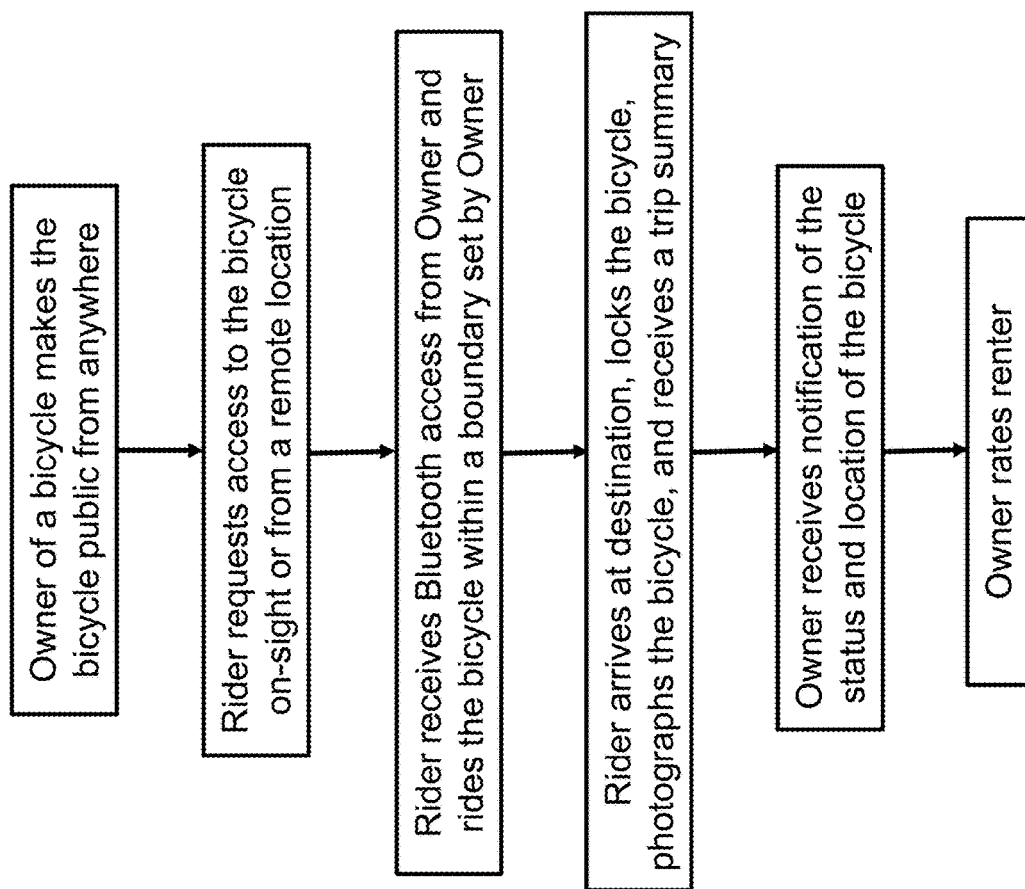
FIG. 13 represents a nonlimiting method of using the locking device of FIG. 1 in combination with a software program as part of a bicycle sharing program.

FIG. 13 represents a nonlimiting method of using the locking device 10 in combination with the software program as part of a bicycle sharing program. In this embodiment, the software application is accessible by a plurality of people who may create user accounts as bicycle owners, bicycle riders, or both. As represented in FIG. 13, a first individual (referred to as "Owner") who owns a bicycle having the locking device 10 thereon may access the software application on a first remote device and use their user account to designate their bicycle as available (referred to in FIG. 13 as "public"). Another individual (referred to as "Rider") who desires to use the bicycle may operate the software application on a second remote device and use their user account to request access to the bicycle. Alternatively, the Rider may be able to request access to the bicycle manually from the control interface of the locking device 10.

The Owner receives the request from the Rider on the first remote device and may either grant or deny use of the bicycle through the software application. In the event that the Owner grants permission to the Rider for use of the bicycle, a wireless signal may be transmitted to the locking device 10 and, in response to receiving the signal, the locking device 10 unlocks the first end 48 of the cable 22 such that the Rider may ride the bicycle. Alternatively, granting of permission by the Owner may allow for wireless communication between the second remote device and the locking device 10 such that the Rider may remotely or manually unlock the cable 22.

The software application may include various other features for both the bicycle owners and the bicycle riders. For example, the software application may provide for real-time location tracking of the locking device 10 during use of the bicycle and continuously or periodically transmitting location data to the remote device of the Owner. This may be accomplished, for example, by incorporating location tracking components into the lock body 12, such as a global positioning system (GPS) receiver and transmitting the locations determined thereby to the first remote device of the Owner. In another embodiment, location tracking may be accomplished by providing wireless communication between the second remote device of the Rider and the locking device 10, obtaining location data from the second remote device with the locking device 10, and then transmitting the location data from the locking device 10 to the first remote device of the Owner. In yet another embodiment, location tracking may be accomplished by transmitting the location data directly from the second remote device of the Rider to the first remote device of the Owner. As indicated in FIG. 13, the software application and location tracking capability of the lock body 12 may be employed to enable the Owner to define a geographic boundary within which their bicycle may be operated by the Rider. In addition to establishing the location of the locking device 10, location tracking may reduce the likelihood of theft.

Once the Rider arrives at a desired destination, the Rider may use the cable 22 to lock the bicycle to a separate structure. At this point, the Rider may remotely indicate with their second remote device or manually with the locking device 10 that the bicycle is no longer in use. Alternatively, the status of the bicycle as no longer being in use may be automatically determined in response to the cable 22 being secured with the locking mechanism 28. As represented in FIG. 13, the Rider may obtain and provide a photograph of the bicycle to show that the bicycle has been secured. If location tracking was performed, a summary of the trip during use of the bicycle may be provided to the Rider and/or the Owner. Once the bicycle is no longer in use, the Owner may receive a notification of the status and location of the bicycle. Optionally, the Owner may receive an indication of the condition of the bicycle (e.g., the photograph). In certain embodiments, the Owner may be able to generate a rating regarding their interaction with the Rider that may be viewable by other users of the software application.

The software application may provide for transmitting and receiving payment for use of the bicycle remotely between the Rider and the Owner. Such payment may be provided at any point prior to, during, or after use of the bicycle. The payment may include various fees such as but not limited to a bicycle rental fee, a fee for using the software application, and/or a fee for any damage caused to the bicycle during use thereof. The Owner and/or the Rider may receive a receipt of the transaction after the payment is complete.

It should be understood that references in the above description of the method to receiving/transmitting information, inputting commands, other otherwise using first and second remote devices are exemplary and do not necessarily indicate that such actions are directly performed on or between the first and second remote devices. Instead, such actions may be performed on or relayed from a remote server accessible by the first remote device, the second remote device, or other devices having access to the software application and/or the remote server. For example, the request by the Rider to use the bicycle may be transmitted to the remote server, rather than directly to the first remote device of the Owner, and associated in the software application with the user account of the Owner. The Owner may then receive a notification from the software application regarding the request or the Owner may access their user account to view the request via a user interface on the first remote device. As such, it should be understood that the software application may be operating on the first remote device, the second remote device, the remote server, or any combination thereof, and the software application may include one or more separate software applications.

Figure 14:
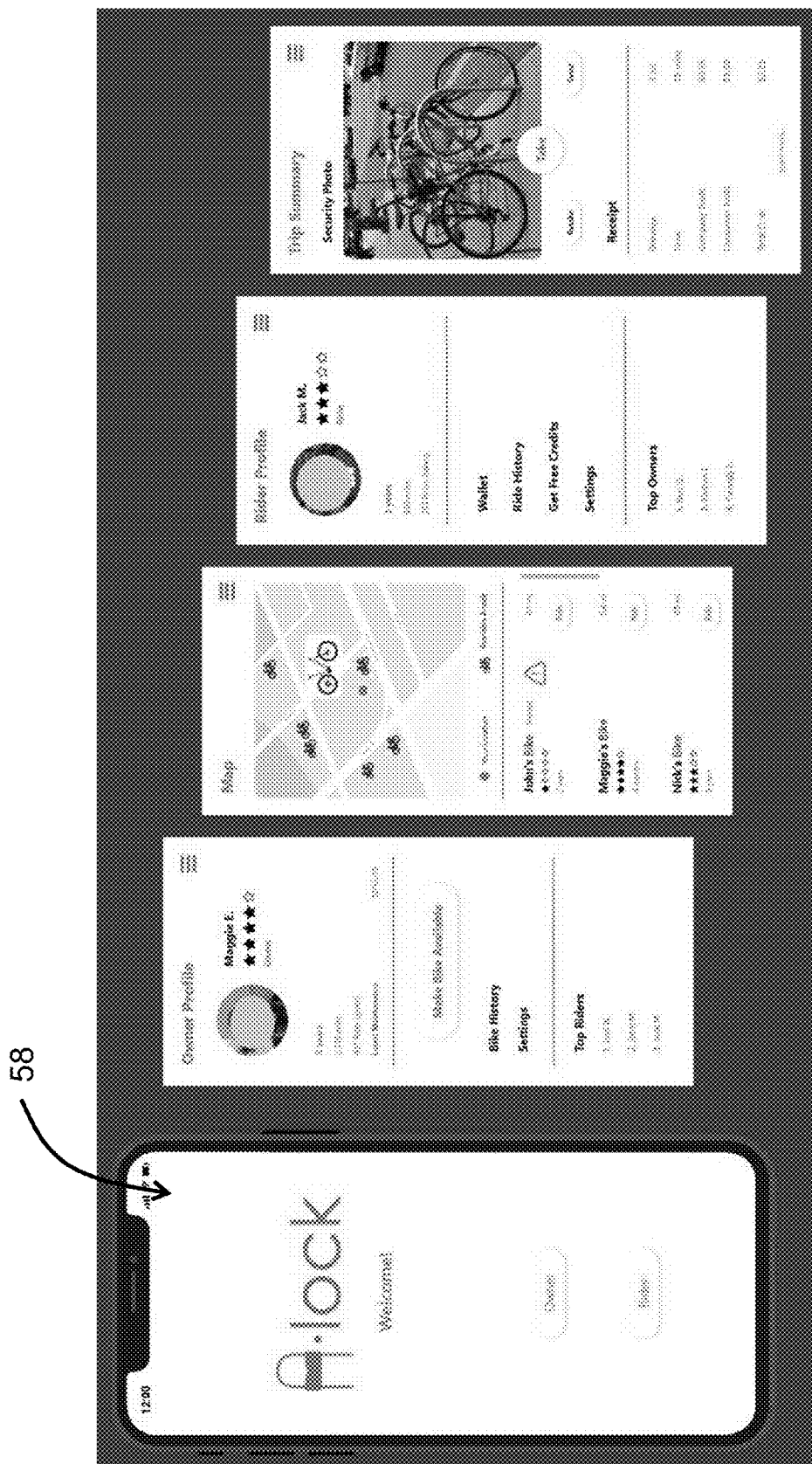
FIG. 14 represents exemplary images of user interfaces during use of the software application, the locking device, and the bicycle.
Figure 15:
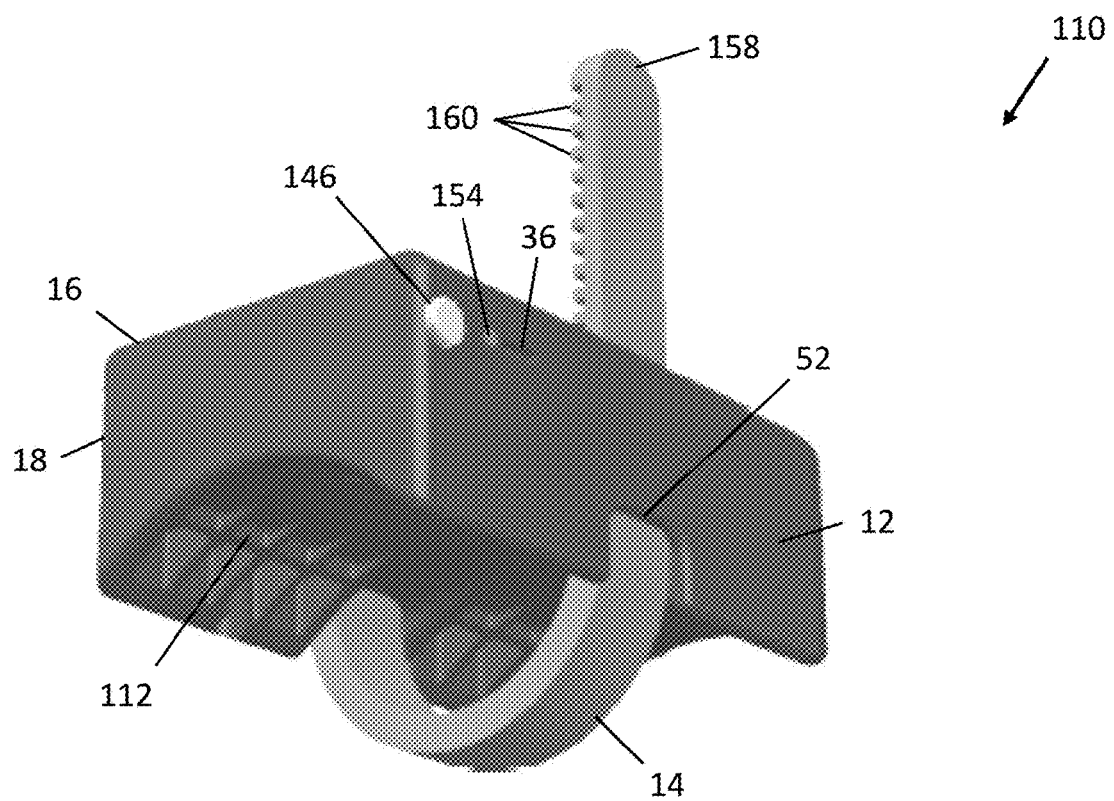
FIG. 15 is a bottom perspective view of a locking device according to a second embodiment in accordance with certain nonlimiting aspects of the invention.

FIG. 14 represents exemplary images of user interfaces that may be displayed by the software application on a remote device 58 (smart phone) during use of the software application, the locking device 10, and the bicycle. In order from left to right, FIG. 14 depicts a welcome screen, a user account for a bicycle owner, a mapping feature showing nearby bicycles that are available for use, a user account for a bicycle rider, and a security photograph and receipt.

FIGS. 15 through 21 represent various aspects of a second embodiment of a locking device 110 for securing personal transportation equipment, including bicycles, and adapted for use in a system (such as in the system 11 schematically represented in FIG. 1) that utilizes the locking device 110. In view of similarities between the embodiments, the following discussion of FIGS. 15 through 21 will focus primarily on aspects of the second embodiment that differ from the first embodiment in some notable or significant manner. Other aspects of the second embodiment not discussed in any detail can be, in terms of structure, function, materials, etc., essentially as was described for the first embodiment.

As represented in FIGS. 15 through 21, the locking device 110 includes a lock body 12 configured to be secured a bicycle or other personal transport equipment with a mounting mechanism, such as the strap 14, a cable 22 that is configured to extend from and retract into the body 12 and to lock the locking device 110 to another structure (e.g., a bicycle rack), a motorized locking mechanism for the cable 22 that is configured to allow the cable 22 to be unlocked remotely from a remote device 58 (such as a smart phone as discussed previously in relation to the embodiment of FIGS. 1 through 14) over a wired or wireless communications link, and an electronic control and communications unit 20 for wirelessly communicating with the remote device 58 and controlling the motorized locking mechanism, and a battery 148 for powering at least the locking mechanism and the control and communications unit 20.

The lock body 12 is formed of a two-part case having a first case portion 16 and a second case portion 18 that together define a hollow enclosed interior. The first and second case portions 16 and 18 may be secured together with fasteners, adhesive, welds, or any other suitable mechanism. Preferably, the first case portion 16 forms a watertight seal with the second case portion 18 to prevent ingress of water into the interior, for example with a seal disposed therebetween. The second case portion 18 in this example defines the majority of the hollow interior, and the first case portion 16 acts as a lid to cover and close the hollow interior. A concave channel 112 is defined on the exterior surface of the second case portion 18 along a longitudinal axis of the body 12. The concave channel 112 is configured to receive an elongate member of the personal transport equipment therein, such as portion of a bicycle frame, to help mount and maintain the body 12 in a preferred position thereon. The case portions 16 and 18 may be made of any suitably stiff material. In one nonlimiting example, the case portions 16 and 18 are made of a hard polymer material, such as polycarbonate-acrylic-styrene-acrylate (PC-ASA).

Figure 17A:
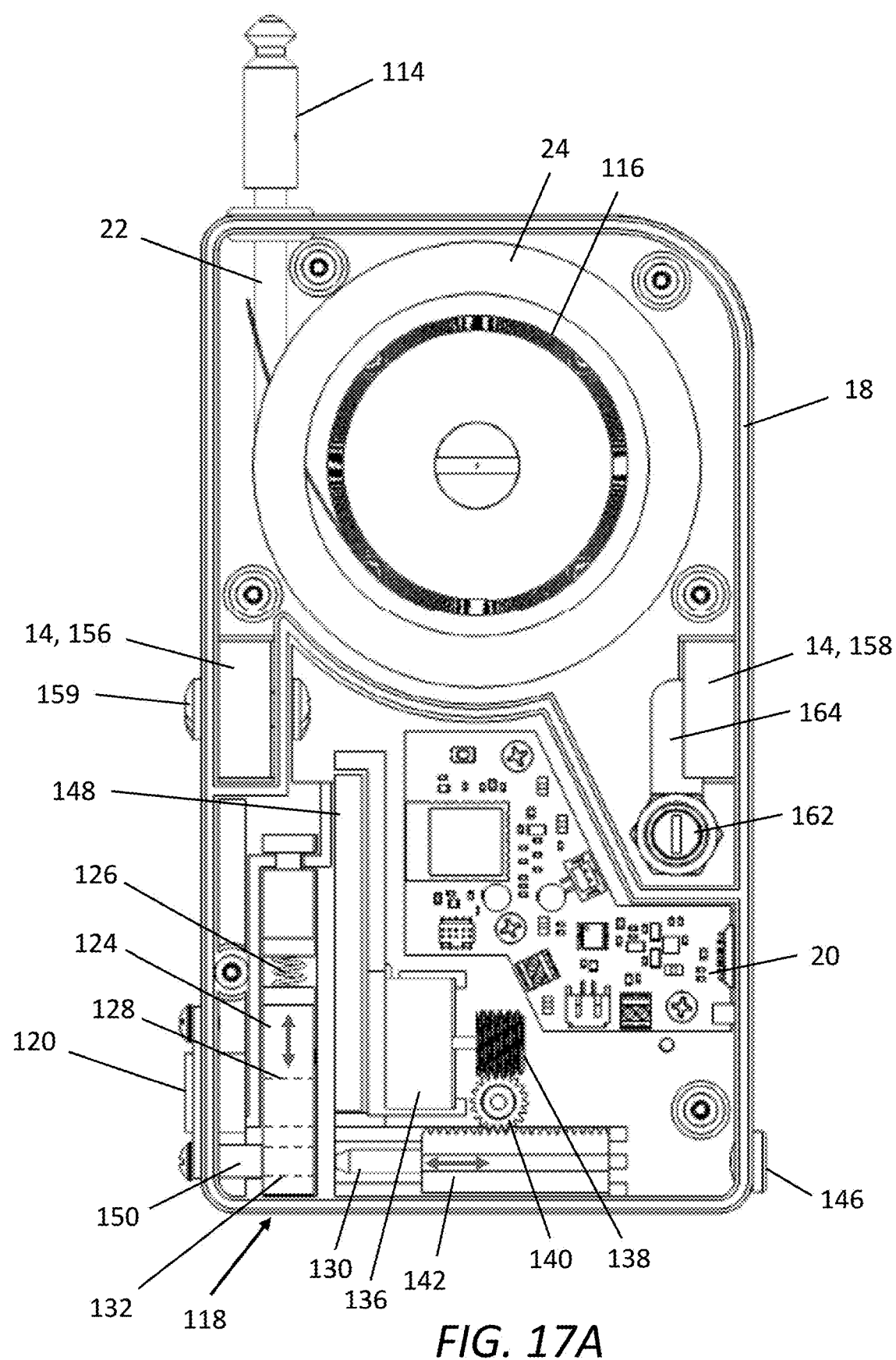
FIG. 17A is a top plan view of the locking device of FIG. 15 with a top cover portion of the body case removed to expose internal features.
Figure 18:
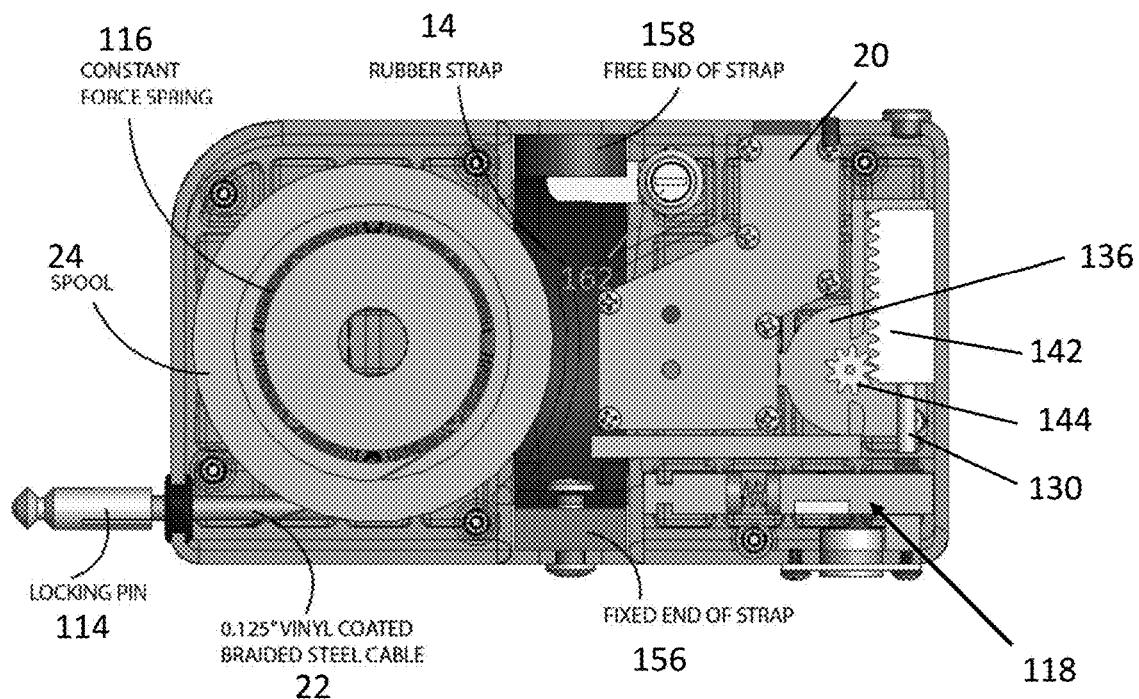
FIG. 18 is a view similar to FIG. 17A of the locking device of FIG. 15 having an alternative drive gear arrangement.

As seen in FIGS. 17A and 18, the cable 22 is wound on a spool 24 disposed in the hollow enclosed interior of the lock body 12. A lock pin 114 is disposed on the first end 48 of the cable 22 that extends through a hole in the lock body 12. The lock pin 114 has a tapered nose at its distal end and a retention groove immediately adjacent the nose for engaging with the aforementioned motorized locking mechanism, as will be discussed hereinafter. Except for its first end 48, the cable 22 (including a second end thereof) is wound around the spool 24. The cable 22 can be extended from the lock body 12 by unwinding it from the spool 24, and can be retracted into the lock body 12 by rewinding the cable 22 onto the spool 24. A spring 116, such as a constant force spring, is coupled to the cable 22 to urge the cable 22 to rewind onto the spool 24 and thereby retract the cable 22 into the lock body 12. Pulling on the first end 48 of the cable 22 unspools the cable 22 from the spool 24 to cause the cable 22 to be drawn from the lock body 12 against the biasing effect of the spring 116, and releasing the cable 22 allows the cable 22 to retract into the lock body 12 and onto the spool 24 under the biasing effect of the spring 116. The cable 22 may be a steel cable and may be covered with a sheath, such as a polymer sheath, or other coating, such as a vinyl plastic coating.

A cable lock 118 is disposed on another area of the lock body 12 and configured to releasably secure the lock pin 114 to the lock body 12. The cable lock 118 includes a pin capture hole 120, represented as being disposed in the case portion 18, that extends into the interior of the lock body 12. The pin capture hole 120 is sized and configured to receive the distal end of the lock pin 114. A pin latch is disposed inside the lock body 12 adjacent the pin capture hole 120 to capture the lock pin 114. The pin latch includes a slide latch 124 that slides back and forth between a capture position and a release position. A spring 126 urges the slide latch 124 toward the capture position. The slide latch 124 includes a first aperture 128 that receives the tapered nose of the lock pin 114. In the capture position, the first aperture 128 is slightly offset from the pin capture hole 120. Inserting the nose of the lock pin 114 through the pin capture hole 120 and into the first aperture 128 pushes the slide latch 124 laterally against the spring 126 into the release position until the retention groove of the lock pin 114 is aligned with the slide latch 124, at which point the spring 126 urges the slide latch 124 back into the retention groove and to the capture position. The retention groove also has a slanted distal wall so that pulling the lock pin 114 back out of the pin capture hole 120 will also cause the slanted distal wall to push the slide latch 124 laterally to the release position, thereby allowing the lock pin 114 to be released from the cable lock 118.

To lock the lock pin 114 in the cable lock 118, a lock member 130 in the lock body 12 can be selectively shifted between a locked position that holds the slide latch 124 in the capture position and an unlocked position that allows the slide latch 124 to shift to the release position. The lock member 130 is in the form of a pin that moves back and forth laterally relative to the movement of the slide latch 124. A second aperture 132 through the slide latch 124 is axially aligned with the lock member 130 when the slide latch 124 is in the capture position. Extending the locking member 130 through the second aperture 132 shifts the lock member 130 to the locked position, which locks the slide latch 124 in the capture position by preventing it from shifting to the release position. Retracting the locking member 130 back out of the second aperture 132 shifts the lock member 130 to the unlocked position, which thereby allows the slide latch 124 to shift to the release position.

A motorized drive mechanism 134 is configured to shift the lock member 130 back and forth between the locked position and the unlocked position in response to control commands, as a nonlimiting example, commands received from a remote device 58 as discussed previously. The drive mechanism 134 includes an electric motor 136 operatively coupled with the locking member 130 by a gear assembly 138. The motor 136 is preferably a reversable (bi-polar) DC motor that can drive in opposite directions depending on the direction of current; however, other types of motors are also possible. The gear assembly 138 includes a rack gear 142 coupled to the locking member 130 and a worm drive, including a worm gear 138 driven by the motor 136 and a worm wheel 140 driven by the worm gear 138, that drives the rack gear 142 axially back and forth. Actuating the electric motor 136 in one direction drives the rack gear 142 and the locking member 130 from the unlocked position to the locked position. Actuating the electric motor 136 in the opposite direction drives the rack gear 142 and the locking member 130 in the opposite direction from the locking position to the unlocking position. Other gear assemblies are also possible, such as a rack and pinion as shown in FIG. 18, in which the rack gear 142 is driven by a pinion gear 144 that is rotated directly by the electric motor 136. However, the worm drive is preferred because in some arrangements it prevents the rack gear 142 and the locking member 130 from undesirably shifting without positive actuation of the motor 136.

A manual override is provided to allow the locking member 130 to be manually shifted from the locked position to the unlocked position, for example if the battery 148 fully discharges while the cable 22 is locked in the cable lock 118. For this feature, the pin of the locking member 130 is preferably a threaded pin that can advance and retract axially relative to the rack gear 142 independently when rotated in either a clockwise or counterclockwise direction. An access port 146 through the case of the lock body 12 is axially aligned with the locking member 130 so that a tool, such as a specialized key or a screwdriver, can be inserted into the lock body 12 and turn the threaded pin to manually retract the locking member 130 out of the second aperture 132 in the slide latch 124, thereby unlocking the slide latch 124.

Once the battery 148 is suitably recharged to be able to operate the electric motor 136 again, the threaded pin may be manually advanced back to its operative position to again shift between the locked and unlocked positions. The access port 146 is preferably plugged to prevent the ingress of dirt and moisture when not in use, such as with a rubber plug that can be removed when the manual override feature must be accessed and replaced when such access is no longer needed.

A proximity switch 150 is disposed adjacent the second aperture 132 to sense when the locking member 130 is in the locked position. The proximity switch 150 may be any type of proximity sensor capable of detecting when the locking member 130 is in the locked position and when it not in the locked position. The proximity switch 150 is operatively coupled with the control and communications unit 20. When the proximity switch 150 senses that the locking member 130 is in the locked position, the control and communications unit 20 causes a lock status indicator 152 on the exterior of the lock body 12 to indicate that the cable lock 118 is locked. When the proximity switch 150 senses that the locking member 130 is not in the locked position, the control and communications unit 20 causes a lock status indicator 152 on the exterior of the lock body 12 to indicate that the cable lock 118 is unlocked. The lock status indicator 152 may be a light that shines red when the cable lock 118 is locked and shines green when the cable lock 118 is unlocked. Other types of visual, audible, and/or tactile indicators may be used.

The battery 148 may be any electrical energy storage device suitable for providing the power needed to drive the motor 136 and the control and communications unit 20, and any other electrical loads present in the locking device 110. The battery 148 may take the form of a single cell or multiple cells formed as a battery pack. In one arrangement, the battery 148 is a lithium-ion polymer battery, although other types of battery, such as nickel-cadmium, may be used. In this example, the battery 148 is a rechargeable battery, and a charging interface, such as the USB connection port 36, is disposed in the lock body case for receiving a power source jack (not shown) to recharge the battery. A battery charge indicator 154 may be provided to indicate the status of the charge in the battery 148. In one example, the battery charge indicator 154 is an LED light that illuminates (e.g., red) when the battery 148 is charging.

The mounting mechanism for securing the locking device 110 to a bicycle or other personal transportation device includes a flexible strap 14 generally similar to the strap 14 described previously in reference to FIGS. 1 through 14, but with certain modifications. In this arrangement, the strap 14 has a fixed end 156 that is attached to the lock body 12 on one side of the concave channel 112, and a free end 158 that is unattached and free to be moved. The fixed end 156 may be fixed to the lock body 12, for example to the second case portion 18, by any suitable mechanism, such as with a screw, bolt, rivet, adhesive, or weld, preferably in such a manner as to prevent the strap 14 from being inadvertently or intentionally separated from the lock body 12. In the nonlimiting example represented in FIGS. 15 through 21, the strap 14 is secured to the second case portion 18 with a faster 159. The free end 158 of the strap 14 can be selectively inserted into and through an entry slot 52 through the lock body 12 on the opposite side of the concave channel 112 from the fixed end 156. The strap 14 includes a plurality of teeth 160 near the free end 158 that engage with another locking mechanism 162 inside the lock body 12 to allow the free end 158 to be secured in any one of a plurality of positions through the entry slot 52. A loop can be formed by the strap 14 across the concave channel 112 by inserting the free end 158 of the strap 14 into the entry slot 52. The size of the loop be adjusted by sliding the free end 158 through the entry slot 52 and the lock body 12 to any of a plurality of lengths out the opposite end of the entry slot 52, and the locking mechanism 162 engages with the teeth 160 to secure the strap 14 in a selected location. In this manner, the strap 14 can be wrapped around a support structure, such as frame member of a bicycle, and adjusted to securely mount the locking device 110 to the support structure by pulling the free end 158 of the strap until the loop tightly clamps the lock body 12 to the support structure. When the strap 14 is in a selected position, it can then be locked in that selected position by engaging the locking mechanism 162 with the teeth 160 of the strap 14.

Figure 16:
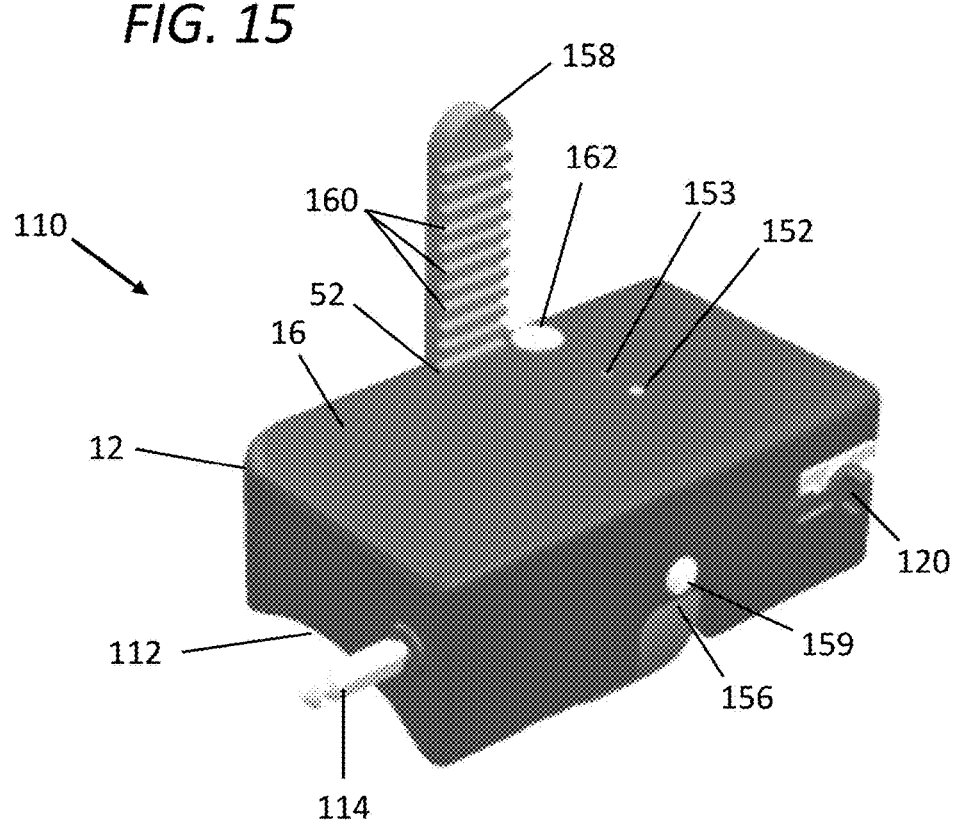
FIG. 16 is a top perspective view of the locking device of FIG. 15.
Figure 17B:
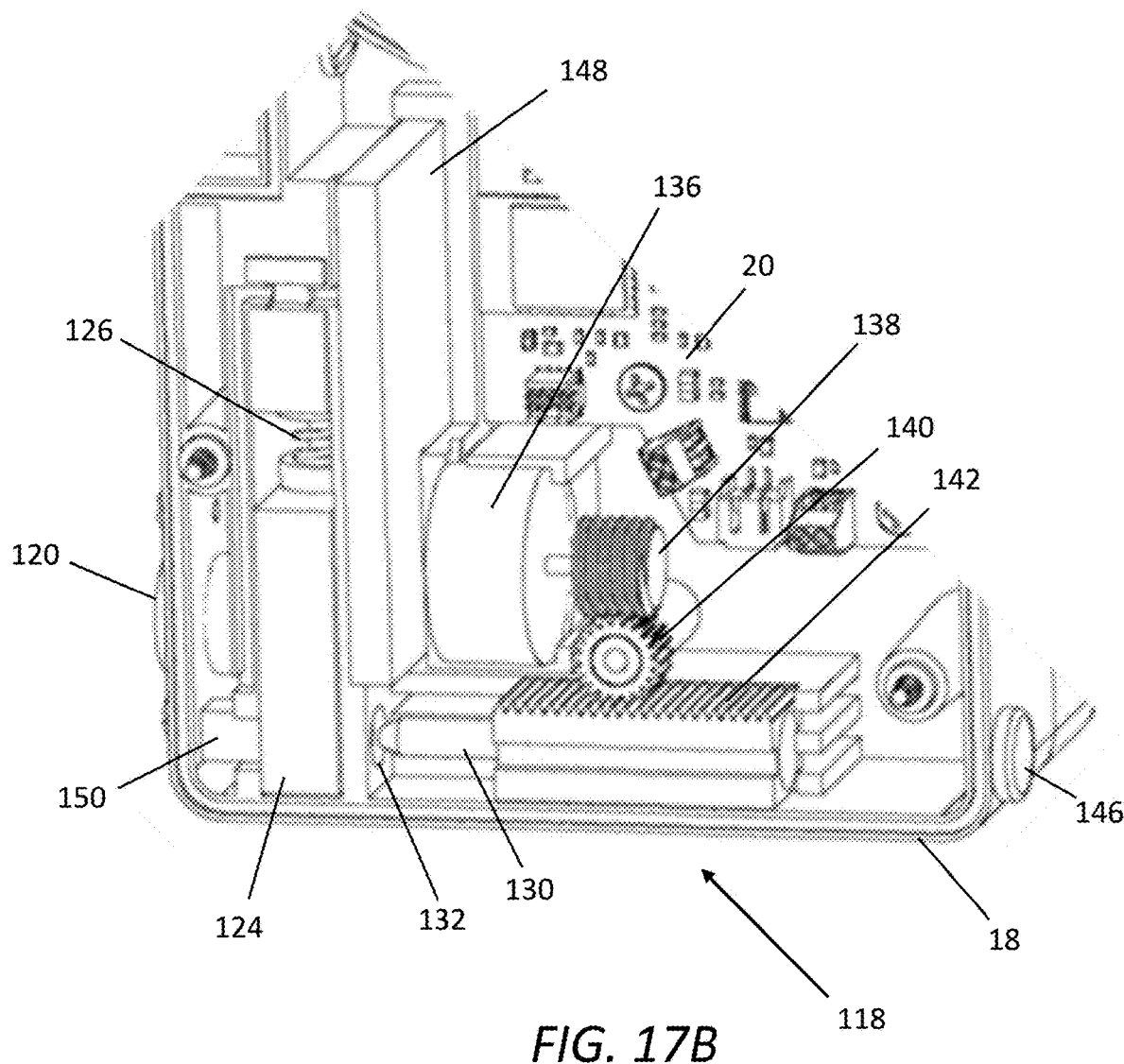
FIG. 17B is an enlarged isometric view of a cable lock visible in FIG. 17A.

As represented in FIGS. 16, 17A, and 17B, the locking mechanism 162 is a manually-operated keyed lock. The keyed lock in this example is a cam lock that rotates a lock arm 164 into and/or out of engagement with the teeth 160 on the strap 14. By using a keyed lock, only a person with the appropriate key, such as the owner of the bicycle and the locking device 110, can mount and/or dismount the locking device 110 from the support structure. This enables, for example, the owner of the bicycle to securely mount the locking device 110 to a bicycle and also allow others to have authorized access to and use of the bicycle through a ride sharing app as described herein that controls unlocking of the motorized locking mechanism for the cable 22. However, other types of locking mechanisms could be used.

Figure 19:
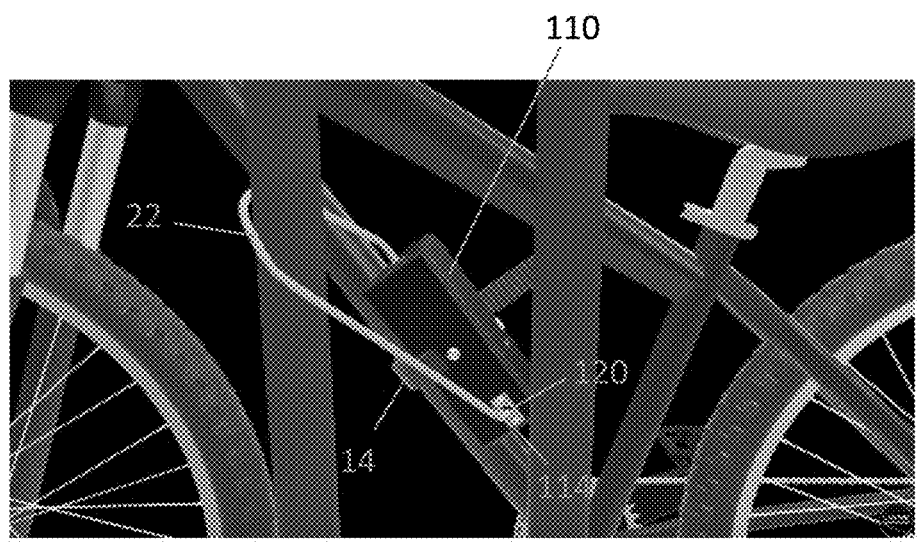
FIG. 19 illustrates the locking device of FIG. 15 in an operative position to secure a bike frame to a bike rack.

As illustrated in FIG. 19, with the locking device 110 suitably mounted to a frame member of a bicycle 60 as described above, the bicycle 60 can then be secured to a separate structure, such as a bike rack, by pulling the cable 22 out of the lock body 12, wrapping the cable 22 around the support structure, inserting the lock pin 114 into the cable lock 118 through the pin capture hole 120, and locking the cable lock 118 by causing the motorized drive mechanism 134 to shift the lock member 130 into the locked position, thereby preventing the lock pin 114 from being removed from the pin capture hole 120. When it is desired to remove the bicycle 60 from the bike rack, the motorized drive mechanism 134 is caused to shift the lock member 130 into the unlocked position, and the lock pin 114 can then be pulled out of the pin capture hole 120 and the cable 22 allowed to be retracted back into the lock body 12 and onto the spool 24 under the biasing effect of the spring 116.

The communication and control unit 20 includes electronic circuitry, integrated circuits, wireless data transceivers, and associated hardware configured to selectively implement and control the various functions disclosed herein. In this arrangement, the communication and control unit 20 includes a printed circuit board that is mounted inside the lock body 12 and includes a motor control circuit, a power supply circuit, and a communication circuit. The motor control circuit is configured to control actuation of the motor 136. The power supply circuit is configured to control recharging of the battery 148. The communication circuit is configured to control communication with one or more remote devices 58 (as discussed previously), preferably with a blue-tooth connection, although other communication protocols and/or systems could be used.

Figure 20:
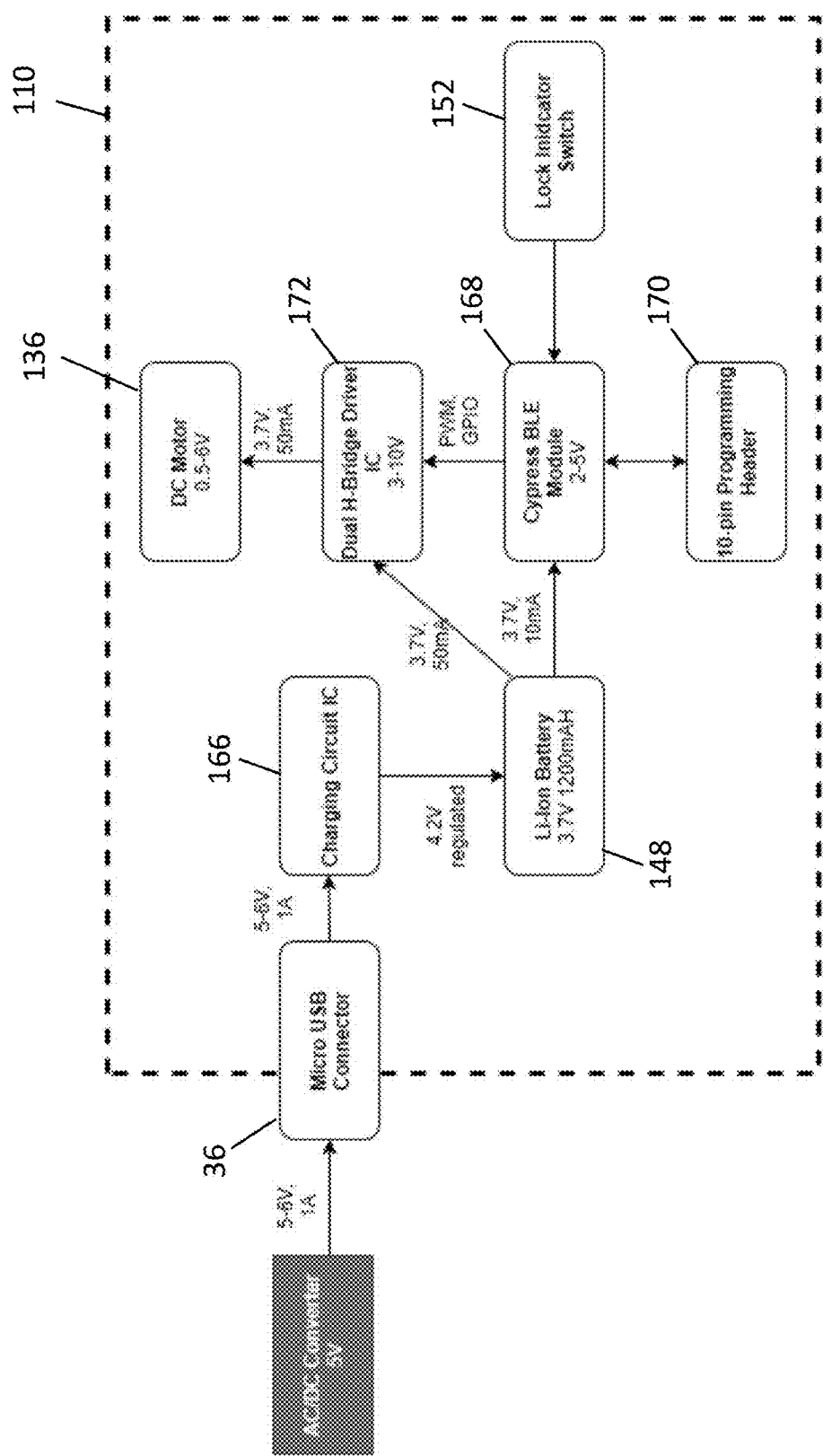
FIG. 20 is a schematic block diagram of a control electrical system for the locking device of FIG. 15.

FIG. 20 illustrates a nonlimiting example of the functionality desirable for the communication and control unit 20. The power supply circuit includes a charging circuit 166 that is operatively connected to the USB charging port and to the battery 148 to control recharging of the battery 148. The charging circuit 166 may be implemented on an integrated circuit. The communication circuit is implemented on a controller 168 that includes a digital wireless data transceiver. The controller 168 is operatively coupled to the battery 148, to the lock status indicator 152, and to a programming header 170. The controller 168 may be, for example, a Bluetooth low-energy module with an integrated microprocessor that is programmable via the programming header 170, which removes the need for a host microprocessor or an external antenna design for the wireless radio. Various LEDs may be controlled by the controller 168 that light up the lock status indicator 152, the battery charging indicator 154, and a data communication indicator 153 that indicates when the transceiver is communicating with and/or in range and capable of communicating with a remote device 58 (as discussed previously). The motor control circuit includes a driver 172 that is connected to the battery 148, to the controller 168, and to the motor 136. The driver 172 may be, for example, a dual H-bridge driver integrated circuit with power width modulation input received from the controller 168 to control the speed and direction of the motor's rotation. Other circuit arrangements are also possible.

Figure 21:
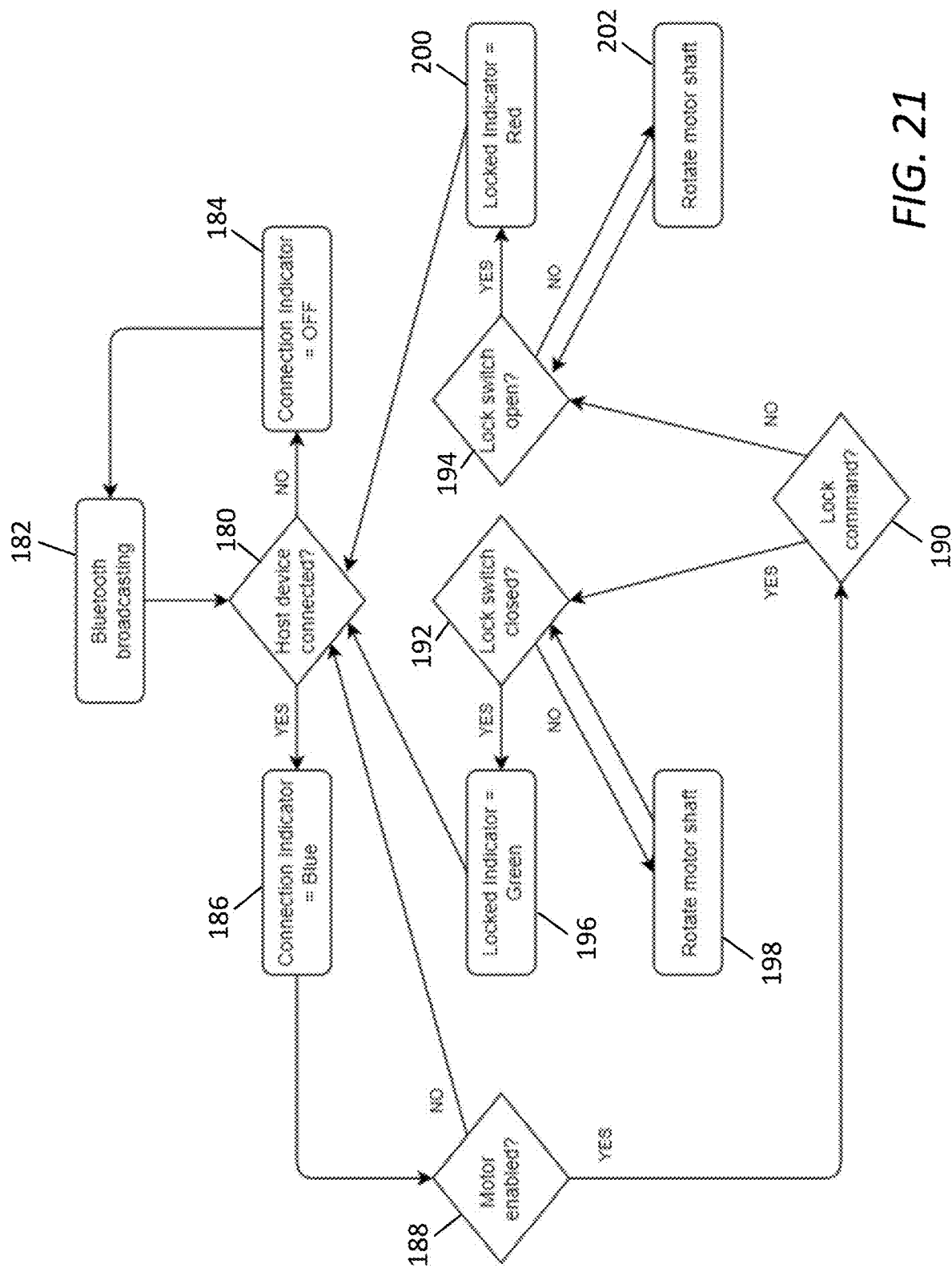
FIG. 21 is a logic flow diagram of control software for the locking device of FIG. 15.

In operation, the communication and control unit 20 may implement and control the operation of various functional features of the locking device 110 based on executable processor instructions (software code) that are executed by the controller 168, as a nonlimiting example, in accordance with a logic flow diagram represented in FIG. 21. At 180, the connection status of the transceiver is determined, for example when a Bluetooth signal is being transmitted at 182. If at 180 it is determined that the transceiver is not connected and/or receiving the transmissions, then the data communication indicator 153 is switched to or left at an "off" status at 184. If at 180 it is determined that the transceiver is connected and/or receiving the transmissions, then the data communication indicator 153 is switched to or left at an "on" status at 186. At 188, the status of the motor 136 is determined. If it is determined that the motor 136 is enabled, then the program advances to 190. If it is determined that the motor 16 is not enabled, then the program returns to 180. At 190, it is determined whether a lock or an unlock command is being received, for example, from the remote device 58. If at 190 it is determined that a lock command is being received, then the program advances to 192, where it is determined whether the lock proximity switch 150 is closed. From 192, if the lock proximity switch 150 is determined to be closed, then at 196 the lock status indicator 152 is caused to indicate that the lock member 130 is in the locked position, for example by causing a green light to be illuminated, and the program then returns to 180. If, however, the lock proximity switch 150 is determined to be open, then at 198 at the motor 136 is caused to rotate so as to shift the lock member 130 to the locked position, and thereafter control returns to 192 and the program eventually returns to 180 in like manner. If at 190 it is determined that an unlock command is being received, then the program advances to 194, where it is determined if the lock proximity switch 150 is open. If at 194 it is determined that lock proximity switch 150 is open, then at 200 the lock status indicator 152 is caused to indicate that the lock member 130 is in the unlocked position, for example, by causing a red light to be illuminated, and the program then returns to 180. If, however, the lock proximity switch 150 is determined to be closed, then at 202 the motor 136 is caused to rotate so as to shift the lock member 130 to the unlocked position, and thereafter control returns to 194 and the program eventually returns to 180 in like manner.

The locking device 110 may be integrated into a system (such as the system 11 schematically represented in FIG. 1) to implement any one or more of the various functionalities relating to use of the locking device 110 to enable bike sharing and/or sharing of other types of personal transportation devices as previously described. Reference is made to the prior description thereof for the sake of brevity. In addition, the locking device 110 may optionally be arranged to include any one or more of the other features described herein relative to the locking device 10. Similarly, the locking device 10 may optionally be arranged to include any one or more of the features described relative to the locking device 110.

As previously noted above, though the foregoing detailed description describes certain aspects of one or more particular embodiments of the invention [and investigations associated with the invention], alternatives could be adopted by one skilled in the art. For example, the locking devices 10 and 110 and their components could differ in appearance and construction from the embodiments described herein and shown in the drawings, functions of certain components of the locking devices 10 and 110 could be performed by components of different construction but capable of a similar (though not necessarily equivalent) function, and various materials could be used in the fabrication of the locking devices 10 and 110 and their components. As such, and again as was previously noted, it should be understood that the invention is not necessarily limited to any particular embodiment described herein or illustrated in the drawings.

The invention claimed is:

1. A locking device comprising:
   a lock body;
   a cable within the lock body and having a first end accessible from an exterior of the lock body;
   a spool configured to extend and retract the cable out of and into the lock body;
   a lock pin disposed at the first end of the cable;
   a cable lock incorporated into the lock body and configured to releasably secure the lock pin to the lock body; and
   an electronic communication and control unit incorporated into the lock body and configured to communicate with a remote device, wherein the electronic communication and control unit controls the cable lock to secure and release the lock pin relative to the lock body to allow the remote device to wirelessly unlock the first end of the cable from the lock body;
   wherein the cable lock comprises:
      a pin capture hole in the lock body and configured to receive the lock pin;
      a pin capture member within the lock body that shifts between a capture position that prevents the locking pin from being retracted from the pin capture hole and a release position that allows the locking pin to be retracted from the pin capture hole;
      a lock member that shifts between a locked position that maintains the pin capture member in the capture position and an unlocked position that allows the pin capture member to shift to the release position; and
      a drive mechanism configured to shift the lock member between the locked position and the unlocked position, wherein the drive mechanism comprises an electric motor and a gear assembly operatively coupling the electric motor to the locking member;
   wherein the electronic communication and control unit controls the electric motor in response to commands received from the remote device to selectively shift the lock member between the locked position and the unlocked position; and wherein the lock member comprises a threaded pin and wherein rotating the threaded pin independent of the drive mechanism shifts the lock member from the locked position to the unlocked position.

2. The locking device of claim 1, wherein the gear assembly comprises a worm drive and a rack gear configured to shift the lock member between the locked position and the unlocked position.

3. The locking device of claim 2, wherein the lock member is coupled to a pinion gear and travels linearly between the locked position and the unlocked position.

4. The locking device of claim 1, wherein the pin capture member comprises a slide member and a spring that urges the slide member toward the capture position.

5. The locking device of claim 1, further comprising:
a proximity switch that senses when the lock member is in the locked position; and
wherein the electronic communication and control unit activates a lock status indicator in response to the proximity switch.

6. A locking device comprising:
a lock body;
a cable within the lock body and having a first end accessible from an exterior of the lock body;
a spool configured to extend and retract the cable out of and into the lock body;
a lock pin disposed at the first end of the cable;
a cable lock incorporated into the lock body and configured to releasably secure the lock pin to the lock body;
an electronic communication and control unit incorporated into the lock body and configured to communicate with a remote device, wherein the electronic communication and control unit controls the cable lock to secure and release the lock pin relative to the lock body to allow the remote device to wirelessly unlock the first end of the cable from the lock body;
a flexible strap having a first end fixed to the lock body and a second end configured to wrap around and mount the lock body to a support structure, wherein the second end adjustably slides through a slot through the lock body; and
a keyed lock in the lock body that selectively engages the second end of the flexible strap to lock the flexible strap in a selected position in the slot.

7. The locking device of claim 1, further comprising:
a flexible strap having a first end fixed to the lock body and a second end configured to wrap around and mount the lock body to a support structure, wherein the second end adjustably slides through a slot through the lock body; and
a keyed lock in the lock body that selectively engages the second end of the flexible strap to lock the flexible strap in a selected position in the slot.

8. The locking device of claim 7, wherein the keyed lock comprises a cam lock with a lock arm that engages teeth along the second end of the flexible strap to lock the flexible strap in the selected position.

9. The locking device of claim 1, further comprising a spring that urges the spool to retract the cable into the lock body.

10. The locking device of claim 1, wherein the locking device is a component of a system that further comprises the remote device and a software application configured to operate on the remote device, communicate with the communication and control unit of the locking device, and provide the commands received to selectively shift the lock member between the locked position and the unlocked position.

11. The locking device of claim 10, wherein the software application is configured to provide remote sharing functionality for sharing a bicycle.

12. The locking device of claim 11, wherein the software application provides for receiving a remote request for use of the bicycle and selectively granting or denying use of the bicycle remotely, wherein granting use of the bicycle causes the locking device to unlock the lock pin.

13. The locking device of claim 12, wherein the software application provides for generating the remote request through an additional remote device and/or manually from the bicycle.

14. A method of locking a bicycle, the method comprising:
securing a lock body of a locking device on a part of the bicycle;
pulling on a first end of a cable accessible from an exterior of the lock body in a direction away from the lock body to uncoil a portion of the cable from a spool within the lock body and extend the portion of the cable from the lock body;
locking the bicycle to a separate structure by wrapping the cable around the separate structure and locking a locking pin on the first end of the cable to the lock body, wherein locking the locking pin comprises:
capturing the locking pin in a pin capture hole in the lock body with a pin capture member shifted into a capture position; and
shifting a lock member in the lock body with a motorized drive mechanism to a locked position that maintains the pin capture member in the capture position; and
wirelessly unlocking the locking pin to unlock the bicycle from the separate structure;
wherein the locking device comprises a flexible strap having a first end fixedly attached to the lock body and a second end, and wherein the step of securing the lock body on the part of the bicycle comprises:
wrapping a flexible strap around the part;
inserting the second of the flexible strap through a slot in the lock body; and
locking the flexible strap in the slot with a keyed lock in the lock body.

15. The method of claim 14, further comprising:
receiving a remote request for use of the bicycle; and
selectively granting or denying use of the bicycle remotely, wherein granting use of the bicycle causes the locking device to unlock the locking pin.

16. The method of claim 15, further comprising receiving payment for use of the bicycle remotely.

17. The method of claim 14, wherein the step of unlocking the locking pin comprises:
shifting the lock member with the motorized drive mechanism to an unlocked position that allows the pin capture member to shift to a release position; and
shifting the pin capture member to the release position to release the locking pin from the pin capture hole.

* * * * *